(12) United States Patent
Förster

(10) Patent No.: US 10,851,865 B2
(45) Date of Patent: Dec. 1, 2020

(54) FREQUENCY-SELECTIVE DAMPING VALVE ASSEMBLY

(71) Applicant: ZF FRIEDRICHSHAFEN AG, Friedrichshafen (DE)

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 52 days.

(21) Appl. No.: 16/331,811

(22) PCT Filed: Aug. 3, 2017

(86) PCT No.: PCT/EP2017/069592
§ 371 (c)(1),
(2) Date: Mar. 8, 2019

(87) PCT Pub. No.: WO2018/046196
PCT Pub. Date: Mar. 15, 2018

(65) Prior Publication Data
US 2019/0249744 A1    Aug. 15, 2019

(30) Foreign Application Priority Data

Sep. 8, 2016   (DE) .................. 10 2016 217 117

(51) Int. Cl.
*F16F 9/512* (2006.01)
*F16F 9/348* (2006.01)
(Continued)

(52) U.S. Cl.
CPC ......... *F16F 9/5126* (2013.01); *B60W 30/025* (2013.01); *B60W 30/182* (2013.01);
(Continued)

(58) Field of Classification Search
CPC ........ F16F 9/5126; F16F 9/3485; F16F 9/368; F16F 15/002; F16F 2228/066; F16F 9/50;
(Continued)

(56) References Cited

U.S. PATENT DOCUMENTS 3,942,806 A    3/1976 Edlund
5,018,608 A    5/1991 Imaizumi
(Continued)

FOREIGN PATENT DOCUMENTS

DE    10 2004 033214    3/2006
DE    102008008575 A1 *    1/2011    ........... F16J 15/3232
(Continued)

*Primary Examiner* — Melanie Torres Williams
(74) *Attorney, Agent, or Firm* — Cozen O'Connor

(57) ABSTRACT

A frequency-dependent damping valve arrangement of a vibration damper having a damping piston with at least one check valve, a control arrangement arranged coaxial to the damping piston including a control pot with a pot wall and a control piston axially displaceably arranged in the control pot that axially limits a control space. The control piston has a seal arrangement that seals the control piston relative to the pot wall including a circumferential groove formed at the control piston and a seal ring arranged therein. The seal arrangement is constructed such that this seal arrangement increases its sealing effect with rising damping medium pressure in the control space and reduces its sealing effect with falling damping medium pressure in the control space.

6 Claims, 3 Drawing Sheets

(51) Int. Cl.
  *F16F 9/36* (2006.01)
  *B60W 30/02* (2012.01)
  *B60W 30/182* (2020.01)
  *B62K 25/00* (2006.01)
  *F16F 15/00* (2006.01)
  *F16K 3/08* (2006.01)
  *F16K 47/00* (2006.01)

(52) U.S. Cl.
  CPC ............ *B62K 25/00* (2013.01); *F16F 9/3485* (2013.01); *F16F 9/368* (2013.01); *F16F 15/002* (2013.01); *F16K 3/085* (2013.01); *F16K 47/00* (2013.01); *F16F 2228/066* (2013.01)

(58) Field of Classification Search
  CPC ... B60K 25/00; B60W 30/025; B60W 30/182; F16K 3/085; F16K 47/00; F16J 15/00; F16J 15/16; F16J 15/164; F16J 15/32; F16J 15/3204
  See application file for complete search history.

(56) References Cited

U.S. PATENT DOCUMENTS

| | | | |
|---|---|---|---|
| 6,454,273 | B1 | 9/2002 | Kashima |
| 7,458,448 | B2 * | 12/2008 | Katou ................... F16F 9/3485 188/282.6 |
| 8,794,403 | B2 * | 8/2014 | Chikamatsu ............ F16F 9/512 188/280 |
| 8,794,405 | B2 * | 8/2014 | Yamashita ............. B60G 13/08 188/317 |
| 2003/0122317 | A1 * | 7/2003 | Andersson ........... F16J 15/3236 277/440 |
| 2004/0163906 | A1 * | 8/2004 | Gundermann ........ F16F 9/5126 188/316 |
| 2015/0041269 | A1 * | 2/2015 | Lim ........................ F16F 9/512 188/322.15 |
| 2015/0276005 | A1 * | 10/2015 | Kim ........................ F16F 9/348 188/317 |
| 2018/0058533 | A1 * | 3/2018 | Bruno .................... B60G 17/08 |

FOREIGN PATENT DOCUMENTS

| | | | | |
|---|---|---|---|---|
| DE | 10 2011 012 730 | | 1/2012 | |
| DE | 10 2011 090 032 | | 6/2012 | |
| DE | 10 2014 210704 | | 12/2015 | |
| DE | 10 2015 220 707 | | 4/2017 | |
| JP | S56 109452 | | 8/1981 | |
| JP | 2006 266279 | | 10/2006 | |
| JP | 2009 287659 | | 12/2009 | |
| KR | 10 1 239 924 | | 10/2012 | |
| WO | WO-2014165951 | A1 * | 10/2014 | ............ B60G 13/08 |
| WO | WO 2015/185279 | | 12/2015 | |

* cited by examiner

FREQUENCY-SELECTIVE DAMPING VALVE ASSEMBLY

CROSS-REFERENCE TO RELATED APPLICATIONS

This is a U.S. national stage of application No. PCT/EP2017/069592, filed on Aug. 3, 2017. Priority is claimed on German Application No. DE102016217117.8, filed Sep. 8, 2016, the content of which is incorporated here by reference.

BACKGROUND OF THE INVENTION

1. Field of the Invention

The invention is directed to a damping valve arrangement of a vibration damper for a motor vehicle with a frequency-dependent damping force characteristic.

2. Description of the Prior Art

The object of a vibration damper in a motor vehicle is to damp vibrations excited by an uneven road surface. In doing so, it is always necessary to find a compromise between driving safety and driving comfort. A vibration damper having a damping valve arrangement adjusted to be hard and accordingly has a high damping force characteristic is optimal for highly safe driving. If there is a high demand for comfort to be met, the damping valve arrangement should be adjusted to be as soft as possible. It is very difficult to find this compromise in a vibration damper with a conventional, non-electronic damping valve arrangement which is adjustable by means of an actuator.

A generic damping valve arrangement with a frequency-dependent damping force characteristic is known from DE 10 2014 210 704. This damping valve arrangement comprises a check valve arranged inside a cylinder filled with a damping medium and at least one flow channel covered by a plurality of valve disks. The damping valve arrangement further comprises a control arrangement arranged coaxial to the check valve that comprises a control pot with an axially displaceable control piston arranged in the control pot. The control piston axially limits a control space enclosed in the control pot and connected to the damping valve arrangement via an inlet connection. A spring element is arranged between the control piston and the check valve and axially introduces a spring force into the control piston on the one hand and into the check valve on the other hand. When the control space is filled with damping medium, the control piston displaces in direction of the check valve and, via the spring element, increases the pressing pressure of the valve disks of the check valve, which increases the damping force.

The control piston is sealed relative to the control pot by a seal arrangement. This seal arrangement comprises a groove formed around the circumference of the control piston and a seal ring arranged in this groove.

When a conventional seal ring is used, it cannot be ruled out that a higher friction occurs during operation, which reduces the preloading force on the valve disks of the check valve that are to be preloaded and leads to reduced damping forces. Above all, variations in frictional force which are associated with the level of frictional force lead to unwanted fluctuations in damping force.

SUMMARY OF THE INVENTION

It is an object of the present invention to provide a frequency-selective damping valve arrangement that reduces the effect of undefined damping force fluctuations and unwanted reduction of damping force.

The control piston of the damping valve arrangement according to one aspect of the invention comprises a seal arrangement constructed so as to increase its sealing effect with rising damping medium pressure in the control space and reduce its sealing effect with falling damping medium pressure in the control space.

In this way, the pressing pressure of the valve disk of the check valve and, accordingly, the damping force can be adjusted in a defined manner.

According to an advantageous constructional variant, the seal ring of the seal arrangement can be constructed as a V-seal positioned in the circumferential groove such that the tip of the V faces in direction of the damping piston and the opening of the V faces in direction of the control space. A V-seal is a seal ring having a V-shaped cross section.

It can also be provided in an advantageous manner that the seal ring is constructed as a four-lip seal, particularly as an X-ring. The advantage of this seal consists primarily in its symmetrical configuration precludes an incorrect installation of the seal ring. By X-ring is meant a seal ring having an X-shape in cross section.

To further support the functioning of the four-lip seal, it can be provided in accordance with a further advantageous constructional variant that the groove comprises a first radial groove wall near to the control space, a second radial groove wall remote of the control space and a groove base that joins the first groove wall and the second groove wall, the groove being constructed such that the second groove wall remote of the control space has a greater radial extension than the first groove wall near to the control space such that the groove base is arranged at least partially so as to be radially closer to the carrier in the area of the second groove wall than in the area of the first groove wall. Further, the seal ring constructed as a four-lip seal, particularly as an X-ring, can be arranged inside the groove such that the two sealing lips of the seal ring are arranged in the area of the first axial extension of the groove base so as to adjoin the first groove wall, and two further sealing lips in the area of the second axial extension of the groove base are arranged in the vicinity of the second groove wall.

According to a further advantageous constructional variant, the sealing effect of the seal arrangement can also be adjusted in a simple manner through the choice of the shape-related configuration of the groove base. For example, the groove base can have a first axial extension and a second axial extension, with the first axial extension extending from the first groove wall substantially parallel to the longitudinal axis of the damping valve arrangement in direction of the damping piston, and with the second axial extension extending from the second groove wall so as to be inclined relative to the longitudinal axis of the damping valve arrangement in direction of the control space, and with the first axial extension and the second axial extension meeting between the first groove wall and the second groove wall.

BRIEF DESCRIPTION OF THE DRAWINGS

The invention will now be described in more detail referring to the figures.

The drawings show.

DETAILED DESCRIPTION OF THE PRESENTLY PREFERRED EMBODIMENTS

Figure 1:
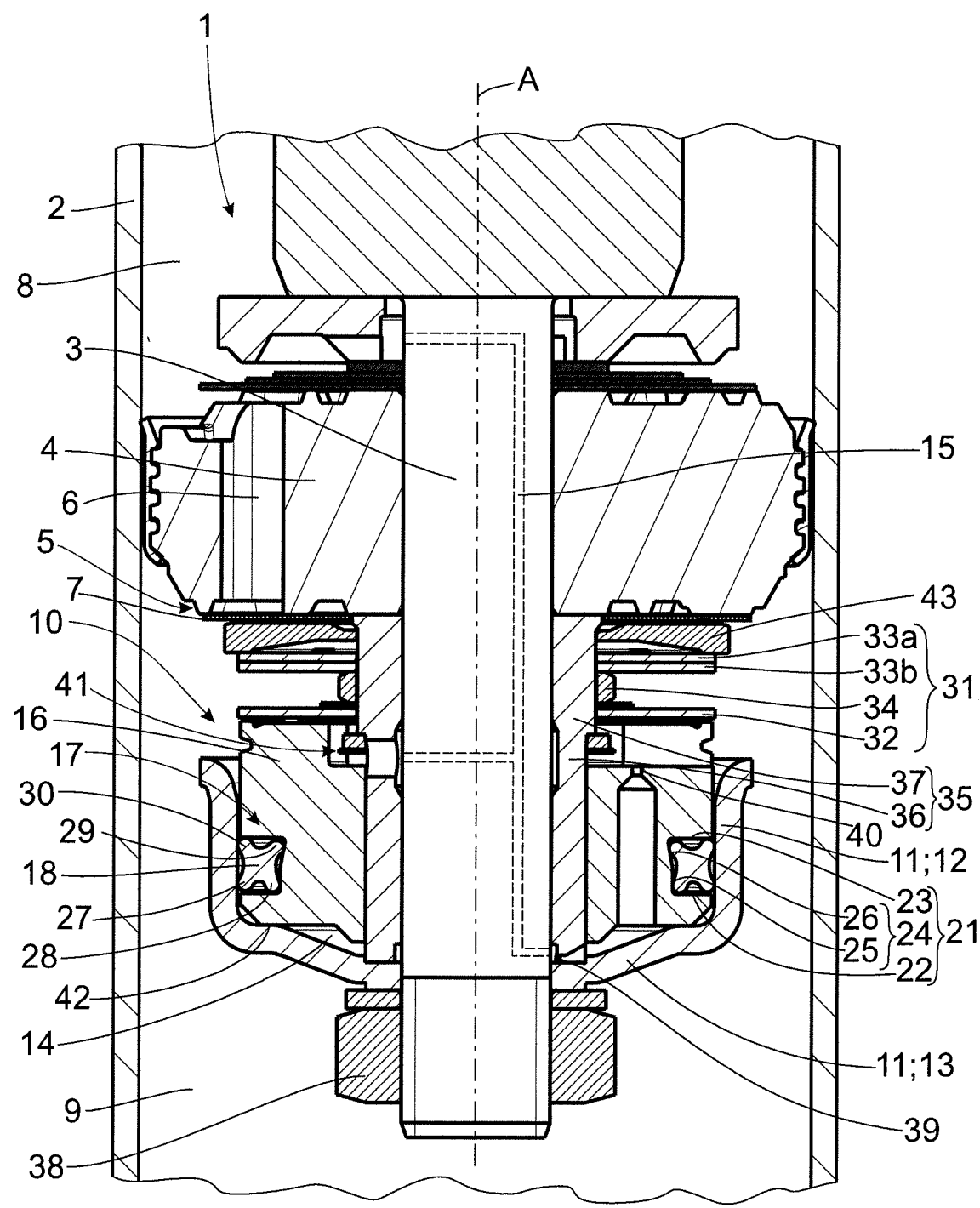
FIG. 1 is a sectional view of an exemplary constructional variant of a frequency-dependent damping valve arrangement according to the invention in a cylinder of a vibration damper.

FIG. 1 shows a portion of a vibration damper for a motor vehicle with a frequency-dependent damping valve arrangement 1 according to one aspect of the invention in a sectional view.

The latter comprises a cylinder 2 which is at least partially filled with a damping fluid.

The damping valve arrangement 1 is axially displaceably arranged inside the cylinder 2 and is fastened to a carrier 3. Damping valve arrangement 1 comprises a damping piston 4 with at least one check valve 5, this check valve 5 having at least a first flow channel 6 formed therein for the damping fluid, which flow channel 6 is covered by at least one valve disk 7.

Damping piston 4 divides a first working chamber 8 from a second working chamber 9 inside the cylinder 2 such that the ratio of the damping medium pressure in the two working chambers 8, 9 varies depending on the direction of axial movements of damping piston 4 in cylinder 2.

Further, damping valve arrangement 1 has a control arrangement 10, which contains a control pot 11 with a cylindrical pot wall 12 and a disk-shaped pot base 13 and a control piston 16 that is axially displaceably arranged in control pot 11 that axially limits a control space 14 enclosed in control pot 11.

A spring arrangement 31 acts axially upon valve disk 7 in direction of flow channel 6 and upon control piston 16 in direction of pot base 13 with a defined spring force and is arranged between damping piston 4 and control arrangement 1.

Figure 2:
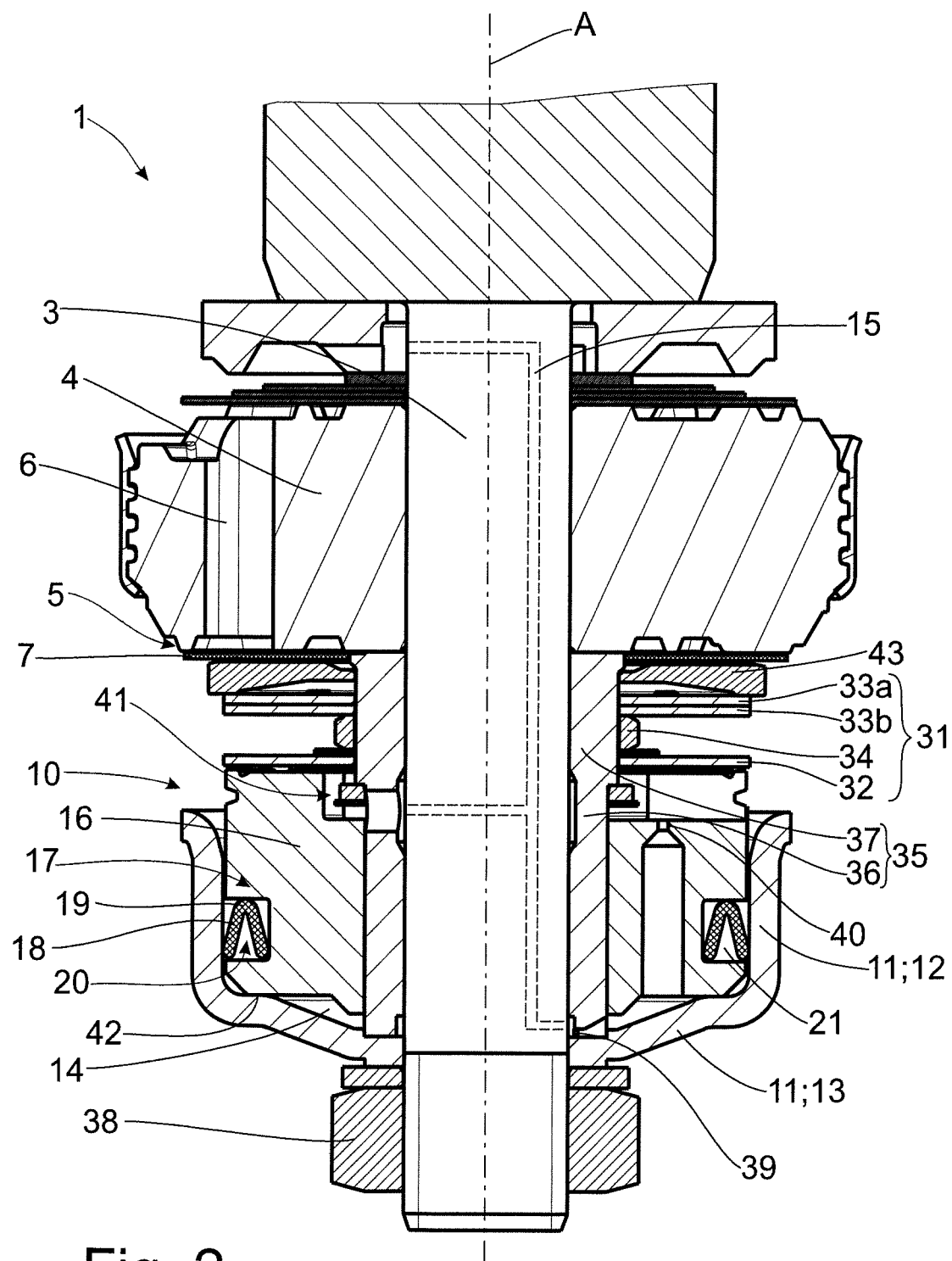
FIG. 2 is a sectional view of a further constructional variant of a frequency-dependent damping valve arrangement according to the invention.

All of the structural component parts of damping valve arrangement 1 are arranged coaxial to one another at carrier 3. As is shown in FIGS. 1 and 2, damping valve arrangement 1 is constructed such that carrier 3 extends centrally through damping piston 4 and a guide sleeve 35 which in turn likewise extends centrally through spring arrangement 31 and control piston 16. Guide sleeve 35 further comprises a first guide portion 36 and a second guide portion 37 axially adjacent thereto. Control piston 16 can slide axially along first guide portion 36, and spring arrangement 31 can slide axially along second guide portion 37. The direction of the axial movements of control piston 16 depends on the damping medium pressure in control space 14.

Carrier 3 is shown here as a so-called piston rod tenon, i.e., an end portion of the piston rod having a reduced diameter. In the constructional variants shown in FIGS. 1 and 2, it is provided that damping valve arrangement 1 comprises at least one second flow channel 15, which is formed at and/or in carrier 3 and guide sleeve 35 and joins first working space 8 and/or second working space 9 with control space 14.

Control pot 11 of control arrangement 1 is connected to carrier 3 in the area of pot base 13 with the aid of connection 38. Connection 38 is shown in FIGS. 1 and 2 as a threaded nut. It will be appreciated that connection 38 can also have a different suitable constructional form. In general, carrier 3 can be connected to control pot 11 by bonding engagement and/or positive engagement and/or frictional engagement.

Control piston 16, which is arranged inside control pot 11, is constructed so as to be axially displaceable so that when a damping fluid pressure persists over a longer period of time in control space 14 of control arrangement 1 the control piston 16 is displaced in direction of valve disk 7 of check valve 5 and can tighten spring arrangement 31 so that the spring force acting on valve disk 7 through spring arrangement 31 and, therefore, the damping force of check valve 5 are increased.

Second flow channel 15 comprises an inlet restrictor 39 which defines the flow of damping medium out of first working chamber 8 into control space 14.

Further, an outlet restrictor 40 is formed at control piston 16 and influences the flow of damping medium out of control chamber 14. This outlet restrictor 40 can also be formed at carrier 3.

A first stop 41 and second stop 42 are formed at control arrangement 1 for defining the soft damping characteristic and hard damping characteristic. First stop 41 is formed as a stop ring in the constructional variants shown in FIGS. 1 and 2, and second stop 42 is formed as an at least partial ridge of pot base 13. It will be appreciated that second stop 42 can also be formed as a stop ring or as an additional stop element which can be arranged inside of control space 14.

Spring arrangement 31 can be constructed in a variety of ways. In the constructional variant shown in FIGS. 1 and 2, it is provided that spring arrangement 31 comprises a plurality of spring elements 32, 33a, 33b, which are separated from one another by a sliding element 34. Spring elements 32, 33a, 33b and sliding element 34 surround guide sleeve 35 and are arranged coaxial to the rest of the structural component parts of damping valve arrangement 1. First spring element 32 is axially supported at control piston 16 on one side and at sliding element 34 on the other side. Further spring elements are axially supported at least indirectly at sliding element 34 on the one side and at valve disk 7 via a spacer ring 43 on the other side.

During a high-frequency excitation of the vibration damper, the damping fluid pressure persists only briefly in control space 14, whereas the damping fluid pressure persists significantly longer in control space 14 during a low-frequency excitation of the vibration damper.

Control arrangement 10 of damping valve arrangement 1 is constructed such that when a damping fluid pressure persists for a longer period of time in control space 14 of control arrangement 10 control piston 16 displaces in direction of valve disk 7 of check valve 5, tensions springs arrangement 31 and accordingly increases the spring force impinging on valve disk 7 through spring arrangement 31 and, therefore, increases the damping force of check valve 5.

As is shown in FIGS. 1 and 2, control piston 16 has a seal arrangement 17 that seals control piston 16 relative to pot wall 12. This seal arrangement 17 comprises a circumferential groove 21 formed at control piston 16 and has a seal ring 18 arranged therein.

Figure 3:
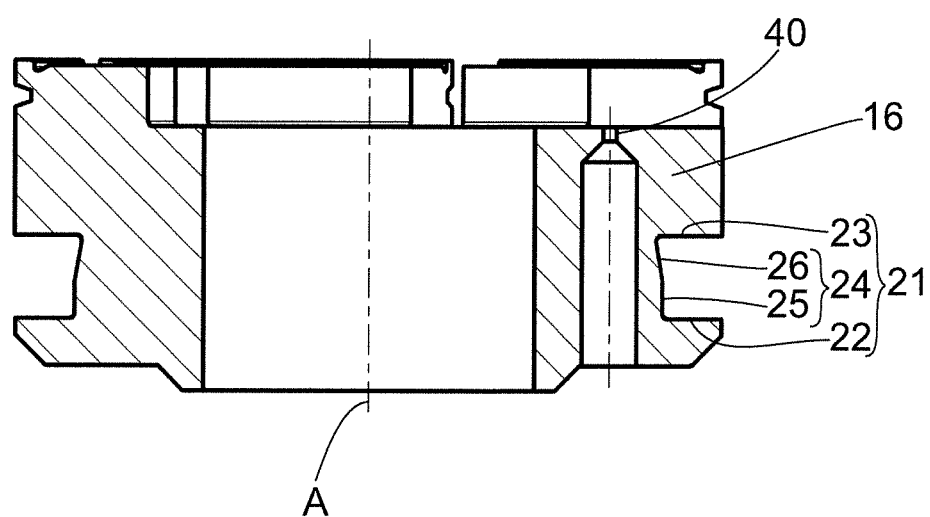
FIG. 3 is sectional view of an exemplary constructional variant of a control piston.

Groove 21 comprises a first radial groove wall 22 near to control space, a second radial groove wall 23 remote of control space and a groove base 24 which joins first groove wall 22 and second groove wall 23. FIGS. 1 and 3, respectively, show a constructional variant in which groove 21 is formed such that the second groove wall 23 remote of the control space has a greater radial extension than the first groove wall 22 near to the control space so that the groove base 24 is arranged at least partially radially closer to carrier 3 in the area of second groove wall 23 than in the area of first groove wall 22.

The constructional variant according to FIG. 1 provides that seal ring 18 is constructed as a four-lip seal, in particular as an X-ring. The seal ring 18, which is constructed as a four-lip seal, in particular as an X-ring, is arranged inside groove 21 in such a way that its two sealing lips 27, 28 are arranged adjoining first groove wall 22 and two further sealing lips 29, 30 of seal ring 18 are arranged in the vicinity of second groove wall 22.

Accordingly, only the two sealing lips 27, 28 facing control space 14 are preloaded in a defined manner, and the two sealing lips 29, 30 arranged facing away from control space 14 can be arranged in groove 21 so as to be free of tension. According to this constructional variant, the preloading of the two sealing lips 27, 28 which are arranged facing control space 14 is defined by the radial extension of first groove wall 22 near to the control space. With rising damping medium pressure in control space 14, the damping medium inevitably exerts a pressure on seal ring 18 in the area of the two sealing lips 27, 28 arranged facing control space 14. In this way, seal ring 18 is reversibly deformed such that the one sealing lip 27 is pressed against pot wall 12 and the other sealing lip 28 is pressed against groove base 24, which heightens the sealing effect. If the damping medium pressure is lower in control space 14 than in the working chamber, the two sealing lips 27, 28 of seal ring 18 are pressed together again or regain their original shape, which reduces the sealing effect of sealing arrangement 17 to an extent ranging from appreciable to minimal.

The constructional variant depicted in FIG. 2 shows an alternative configuration of seal ring 18.

According to the constructional variant shown in FIG. 2, seal ring 18 can be formed as a V-seal, wherein the tip 19 of the V faces in direction of damping piston 4 and the opening 20 of the V faces in direction of control space 14.

The opening 20 of the V is accordingly exposed to the rising damping medium pressure in control space 14. The damping medium reversibly deforms seal ring 18 and presses the one leg of the V-seal against pot wall 12 and the other leg against groove base 24, which heightens the sealing effect. If the damping medium pressure is lower in control space 14 than in the working chamber, the two legs of the V-seal are pressed together or regain their original shape, which reduces the sealing effect of sealing arrangement 17 to an extent ranging from appreciable to minimal.

Accordingly, the seal arrangement 17 is constructed in such a way that its sealing effect is increased when the damping medium pressure in control space 14 increases and is reduced when a damping medium pressure in control space 14 decreases.

The sealing effect of seal arrangement 17 can be adjusted in a defined manner through the choice of the shape-related configuration of groove walls 22, 23 and/or of groove base 24.

FIG. 3 shows by way of example that groove base 24 can be constructed such that it has a first axial extension 25 and a second axial extension 26, wherein first axial extension 25 proceeding from first groove wall 22 extends substantially parallel to longitudinal axis A of damping valve arrangement 1 in direction of damping piston 4, and second axial extension 26 extends from second groove wall 23 in direction of control space 14 at an inclination to longitudinal axis A of damping valve arrangement 1, and first axial extension 25 and second axial extension 26 meet between first groove wall 22 and second groove wall 23.

The seal ring 18 which is constructed as a four-lip seal, particularly as an X-ring, can then be arranged inside groove 21 such that its two sealing lips 27, 28 are arranged in the area of first axial extension 25 of groove base 24 and two further sealing lips 29, 30 are arranged in the area of second axial extension 26 of groove base 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A frequency-dependent damping valve arrangement for a vibration damper of a motor vehicle, comprising:
   at least one check valve;
   a damping piston with the at least one check valve and configured to be arranged inside of a cylinder, which is at least partially filled with a fluid damping medium, fastened to a carrier and axially movable inside of the cylinder, wherein the damping piston separates a first working chamber from a second working cylinder inside the cylinder;
   a control arrangement arranged at the carrier coaxial to the damping piston that comprises:
      a control pot with a pot wall;
      a pot base arranged at an end of the control pot remote of the at least one check valve;
      a control space arranged in the control pot and filled with the fluid damping medium;
      at least a second flow channel for the fluid damping medium that connects at least the first working chamber to the control space;
      an axially displaceable control piston arranged in the control pot that axially limits the control space, wherein a direction of axial movements of control piston depends on a damping medium pressure in the control space; and
      a seal arrangement of the control piston that seals the control piston relative to the pot wall and is constructed such that the seal arrangement increases its sealing effect with a rising damping medium pressure in the control space and reduces its sealing effect with a falling damping medium pressure in the control space,
      wherein the seal arrangement comprises a circumferential groove formed at the control piston and a seal ring arranged in the circumferential groove;
      wherein the groove comprises:
         a first radial groove wall near the control space;
         a second radial groove wall remote of the control space; and
         a groove base which joins the first groove wall and the second groove wall,
      wherein the groove is constructed such that the second groove wall remote of the control space has a greater radial extension than the first groove wall near to the control space such that the groove base is arranged at least partially so as to be radially closer to the carrier in an area of the second groove wall than in an area of the first groove wall.

2. The frequency-dependent damping valve arrangement according to claim 1, wherein the seal ring is a V-seal, wherein a tip of the V-seal faces the damping piston and an opening of the V-seal faces the control space.

3. The frequency-dependent damping valve arrangement according to claim 1, wherein the seal ring is constructed as a four-lip seal, configured as an X-ring.

4. The frequency-dependent damping valve arrangement according to claim 1, wherein
the groove base has a first axial extension and a second axial extension,
the first axial extension extends from the first groove wall substantially parallel to a longitudinal axis of the damping valve arrangement towards the damping piston,
the second axial extension extends from the second groove wall so as to be inclined relative to the longitudinal axis of the damping valve arrangement towards the control space, and
the first axial extension and the second axial extension meet between the first groove wall and the second groove wall.

5. The frequency-dependent damping valve arrangement according to claim 4, wherein
the seal ring is constructed as a four-lip seal, configured as an X-ring and arranged inside the groove such that two sealing lips of the seal ring are arranged in an area of the first axial extension of the groove base to adjoin the first groove wall, and
two further sealing lips in an area of the second axial extension of the groove base are arranged in a vicinity of the second groove wall.

6. A vibration damper with a frequency-dependent damping valve arrangement, comprising:
a cylinder, which is at least partially filled with a fluid damping medium;
a frequency-dependent damping valve arrangement comprising:
at least one check valve;
a damping piston with the at least one check valve and configured to be arranged inside of the cylinder, wherein the damping piston separates a first working chamber from a second working cylinder inside the cylinder;
a control arrangement arranged at a carrier coaxial to the damping piston that comprises:
a control pot with a pot wall;
a pot base arranged at an end of the control pot remote of the at least one check valve;
a control space arranged in the control pot and filled with the fluid damping medium;
at least a second flow channel for the fluid damping medium that connects at least the first working chamber to the control space;
an axially displaceable control piston arranged in the control pot that axially limits the control space, wherein a direction of axial movements of control piston depends on a damping medium pressure in the control space; and
a seal arrangement of the control piston that seals the control piston relative to the pot wall and is constructed such that the seal arrangement increases its sealing effect with a rising damping medium pressure in the control space and reduces its sealing effect with a falling damping medium pressure in the control space,
wherein the seal arrangement comprises a circumferential groove formed at the control piston and a seal ring arranged in the circumferential groove;
wherein the groove comprises:
a first radial groove wall near the control space;
a second radial groove wall remote of the control space; and
a groove base which joins the first groove wall and the second groove wall,
wherein the groove is constructed such that the second groove wall remote of the control space has a greater radial extension than the first groove wall near to the control space such that the groove base is arranged at least partially so as to be radially closer to the carrier in an area of the second groove wall than in an area of the first groove wall.

* * * * *